Jan. 9, 1945. A. C. RUGE Re. 22,589
STRAIN GAUGE WITH THERMAL CURRENT CONTROL
Original Filed Sept. 16, 1939
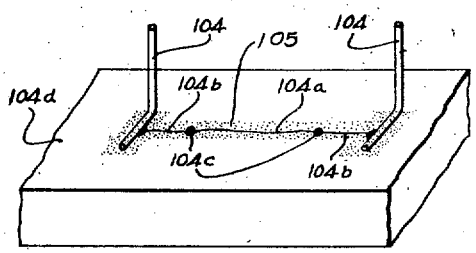
INVENTOR
ARTHUR C. RUGE
By Edward A. Machanay
ATTORNEY Reissued Jan. 9, 1945 Re. 22,589

UNITED STATES PATENT OFFICE 22,589

STRAIN GAUGE WITH THERMAL CURRENT CONTROL

Arthur C. Ruge, Cambridge, Mass., assignor to The Baldwin Locomotive Works, a corporation of Pennsylvania Original No. 2,334,843, dated November 23, 1943, Serial No. 453,505, August 4, 1942, which is a division of Serial No. 295,207, September 16, 1939. Application for reissue October 4, 1944, Serial No. 557,115

4 Claims. (Cl. 201—63)

This invention relates generally to strain gauges and more particularly to a gauge of the type employing a continuous solid filament of electrical conducting material bonded throughout its effective length to the surface of a member under test and whose electrical resistance varies in response to strain, this application being a division of my copending application Serial No. 295,207, filed September 16, 1939.

In a gauge of the foregoing type an electrical current is passed through the wire filament and as a result thermal currents may arise which will distort the accuracy of the gauge, this possibility of distortion being aggravated by the extremely small magnitude of the resistance change in the gauge in response to variations in strain.

It is an object of my invention to provide an improved electrical strain gauge that eliminates or minimizes thermal current. A further object is to provide an improved electrical strain gauge adapted to eliminate thermal currents in a simple, direct and effective manner, is economical in construction and operation and is compact and rugged.

Other objects and advantages will be more apparent to those skilled in the art from the following description of the accompanying drawing which is a perspective of my improved gauge applied to a test specimen.

A strain responsive filament 104*a* of electrical conducting material such as disclosed in my copending application is bonded throughout its effective length to the surface of a member 104*d* subject to strain. Short pieces 104*b* of material identical to leads 104 are interposed between the strain filament 104*a* and leads 104, 104, the pieces 104*b* being very small in cross-sectional area relative to their length. The entire filament and lead elements are cemented, as indicated by the speckled area 105, to a carrying medium or to a specimen and suitably insulated therefrom if necessary. The material of which filament 104*a* is made and also its various characteristics are disclosed in my said copending application and hence need not be further described in this application except to point out that the filament is preferably of the approximate order of .001" to .003" in diameter thus showing the extremely minute nature of the electrical element.

If the leads 104, 104 were connected directly to filament 104*a* at points 104*c* and should one of these junctures be at a different temperature from the juncture for the other lead, then in general a current will pass through the circuit by virtue of thermal currents between the leads and filament arising from a temperature difference at these junctures. It is possible to eliminate thermal current effects from the results of electrical resistance measurements by methods well-known in precise resistance work but such methods are not convenient in strain measurement work. For example, if one terminal lead becomes warmed more than the other, even if the temperature in the specimen is uniform, heat will flow down that lead to warm both the lead and its junction with filament 104*a*. This may happen without the observer's knowledge thus causing him to make an error in strain reading. However, in my improved arrangement if heat is applied to one of the leads 104 it will have to flow through pieces 104*b* before reaching the thermal junction 104*c*. Since the piece 104*b* is small in area and relatively long, as compared to the length of filament 104*a*, substantially all heat applied to lead 104 will flow into the surrounding structure or specimen 104*d* before the heat reaches the thermal junction 104*c*. Hence the strain filament 104*a* will be unaffected by any thermal currents. The thermal dissipating pieces 104*b* may be made of material different from that of the leads 104 provided it has a zero or negligible thermal-electrical effect against the leads. For example, the leads can be copper and the pieces 104*b* can be Manganin, while the strain sensitive filament can be any desired material such as Elinvar or Advance. It is not important whether the pieces 104*b* possess strain sensitivity, the choice here depending upon what overall characteristics are desired.

If the surface of specimen 104*d* is not at a uniform temperature all over, then it is desirable to have the two junctions 104*c* close together. I have used strain gauges embodying my invention, but without pieces 104*b*, in circuits which were very difficult to deal with due to thermal currents. After adding pieces 104*b* the thermal currents dropped to a negligible value even under adverse temperature conditions. For purposes of illustration, Advance wire may be used as the strain filament 104*a* as this has a high thermal electric effect against copper. The pieces 104*b* may be copper wire of a length about ¾" and .002" diameter while the leads 104 may be copper about .04" diameter. With such an arrangement the lead wires could be purposely heated far more than they would be normally heated and yet the .002" wires would add so little resistance that the sensitivity of the usual Wheatstone measuring bridge would not be measurably affected.

From the foregoing disclosure it is seen that I have provided an extremely simple and highly effective arrangement for eliminating or minimizing thermal currents in a gauge which has a high degree of sensitivity, accuracy and responsiveness without in any way sacrificing these very desirable qualities.

It will of course be understood that various changes in details of construction and arrangement of parts may be made by those skilled in the art without departing from the spirit of the invention as set forth in the appended claims.

I claim:

1. A strain gauge comprising a filament of continuous solid electrical conducting material whose electrical resistance varies in accordance with changes of strain therein, means for bonding said filament throughout its effective length to a member subject to strain whereby the strain of the filament follows that of said member to effect a corresponding change of filament resistance, leads for said filament, and other filaments connected to the ends of said bonded filament and to said leads and having a cross-sectional area relative to that of said leads for substantially preventing thermal current effects in said bonded filament.

2. A strain gauge comprising a filament of continuous solid electrical conducting material whose electrical resistance varies in accordance with changes of strain therein, means for bonding said filament throughout its effective length to a member subject to strain whereby the strain of the filament follows that of said member to effect a corresponding change of filament resistance, leads for said filament, other filaments connected to the ends of said strain filament and to said leads and having a smaller cross-sectional area than said leads thereby to prevent thermal current effects, and means for bonding said thermal current filaments through their length to the member subject to strain.

3. A strain gauge comprising a filament of continuous solid electrical conducting material whose electrical resistance varies in accordance with changes of strain therein, means for bonding said filament throughout its effective length to a member subject to strain whereby the strain of the filament follows that of said member to effect a corresponding change of filament resistance, leads for said filament, and wires of smaller size than said leads disposed between and connected to the leads and filament.

4. The combination set forth in claim 3 further characterized in that said wires and leads are commonly bonded with said filament to a member subject to strain.

ARTHUR C. RUGE.